Patented Apr. 11, 1939

2,154,185

UNITED STATES PATENT OFFICE 2,154,185

BONDED ABRASIVE AND METHOD OF MAKING THE SAME

Norman P. Robie, Niagara Falls, N. Y., assignor to The Carborundum Company, Niagara Falls, N. Y., a corporation of Delaware No Drawing. Application September 30, 1937, Serial No. 166,565

4 Claims. (Cl. 51—280)

My invention relates to a method of bonding granular material and more particularly to a method of bonding abrasive granules whereby the granules coated with binder are consolidated by the action of solvent vapors.

It is an object of my invention to provide a novel and improved method of bonding granular material by treatment with the vapors of a solvent for the binder under superatmospheric pressure.

It is a further object of my invention to provide an improved method of bonding granular material with plasticizable organic binders which are fusible only with difficulty at temperatures which do not deteriorate the binders.

Previous to my invention abrasive granules coated with resin have been consolidated by heating into bonded abrasive articles such as wheels, stones, and the like. This procedure may be used with the usual resins which are in general of two types, heat-hardenable and thermoplastic. The former, represented by phenolic-aldehyde condensation product resins, such as "Bakelite", are easily fusible in their unhardened state, while the latter, represented by polystyrene resins such as "Resoglaz", are of course permanently fusible. Other plastics, as for example polyvinyl alcohol, are fusible only with difficulty, if at all, and accordingly the ordinary molding processes are unsuitable.

These difficultly fusible and infusible binding materials may be used as bonds by making use of their solubility in various solvents and subjecting shaped mixtures of granular material and binding material to the combined action of heat, pressure and the vapors of a solvent for the binding material.

The manner in which the above stated objects of my invention may be achieved will be understood from the following examples:

Example I

Using crushed fused alumina, 2050 parts of granules ranging in size from 12 to 20 mesh are wet with 150 parts of a 28% aqueous solution of polyvinyl alcohol which has previously been treated, in a manner known to the art, to lower its viscosity. The thus wet granules are then thoroughly coated by mixing with 60 mesh and finer powdered polyvinyl alcohol. The resulting bond-coated granules are evenly distributed in a mold and pressed cold under a pressure of 2000 lbs./sq. in. to the shape of an abrasive wheel.

The pressed wheel is placed on a porous support with the sides of the wheel supported by a paper ring. This assembly is then placed in a steam autoclave and subjected to a steam pressure of 120 lbs. gauge for 1½ hours. At the end of this time the steam is discharged and the wheel removed. The wheel at this stage is in a moist, soft, plastic condition, the powdered bond having softened and at least partially dissolved thus interbonding the granules and forming a unitary structure.

The moisture is thoroughly removed from the wheel by drying for 16 hours at 300° F. Although such a wheel has only slightly over 6% of binder, which may be regarded as rather low, it will be very hard and tough with a metallic ring and suitable for snagging metal castings.

Example II 2500 parts of crushed fused alumina, the granules ranging in size from 12 to 20 mesh, are wet with 250 parts of a 28% aqueous solution of polyvinyl alcohol which has previously been treated, in a manner known to the art, to lower its viscosity. The thus wet granules are then thoroughly coated by mixing with powdered polyvinyl alcohol of 109 mesh and finer. The mixture resulting is free-flowing and easy to distribute in a mold where it is cold pressed under a pressure of 2000 lbs./sq. in.

The pressed wheel is placed on a porous support with its sides supported and air dried for several hours. It is then placed in a steam autoclave and subjected to a steam pressure of between 60 and 80 lbs. gauge for ½ hour.

The wheel after removal from the autoclave is exposed to the air to allow partial air drying and is then baked for 24 hours at from 250 to 300° F. The finished wheel will be strong and tough and suitable for snagging steel.

Various modifications of the described procedure are possible. Following the previously described procedure, after the bond has been softened and the abrasive granules have been bonded together, insolubilizing agents may be introduced into the autoclave to react with the bond while it is in a soft, moist condition. With a polyvinyl alcohol bond acetic acid and formaldehyde may be introduced as vapors to insolubilize the bond.

Other bonds and solvents are adaptable to the practice of my invention, as, for example, certain vinyl resins of high molecular weight which can be fused only at temperatures near their decomposition point. Polyvinyl acetate acetal resins produced from very high molecular weight polyvinyl acetate are of this type. In the application of my improved procedure, granular material may be wet with benzaldehyde as a solvent and coated with this resin in finely divided form. After cold molding the molded article is subjected in an autoclave to benzaldehyde vapors at suitable temperatures and under pressure to effect bonding.

It is obvious that wide variation in the amount and size of the granular material and the amount of bond is possible and any suitable way of coating the granules with bond may be used. The temperatures and pressures used in the autoclave treatment and the time of treatment will, of course, vary depending upon the above-mentioned variables and others such as the solvent content and temperature of the article when placed in the autoclave. Determination of the proper conditions of treatment may be easily made by those skilled in the art. Cold pressing of the coated granules is not vital but this procedure is convenient in obtaining a uniformity of structure. In making abrasive articles other abrasives such as silicon carbide, emery and the like may be used.

The shaped articles before autoclaving and after the cold pressing, if this step is used, may be dried to remove solvent from the bond coatings on the granules and the articles may be heated before autoclaving. Heating the shaped articles before subjecting them to treatment in the autoclave is believed to reduce the capillary condensation in the article during this treatment. Both heating and drying the article before treatment in the autoclave render the bond less susceptible to flow.

My improved process has an advantage over previous ones in that the simultaneous application of heat, pressure and solvent vapors permits the use of lower temperatures than the application of heat and compression as in hot molding allows. Further the pressure is applied to the bond without compressing the article and rendering it of high density. The process is particularly suitable for making use of soluble but difficultly fusible binders and produces a relatively open porous structure in the finished article.

In the examples previously given I have set forth several embodiments of my invention, but I do not intend to be limited in scope except by the appended claims.

This application is in part, a continuation of my previously filed application, Serial No. 115,191, filed December 10, 1936.

I claim:

1. The improvement in the process of making articles from granular material bonded with a difficultly fusible but solvent-softenable binder which comprises the steps of preparing a mixture of granular material and binder of the character specified, forming a shaped mass from the mixture, and subjecting the shaped mass to the vapors of a solvent for said binder under super-atmospheric pressure to bring about bonding of the granular material.

2. The novel process of making articles of granular material bonded with polyvinyl alcohol which comprises the steps of forming a shaped mass from a mixture of granular material and polyvinyl alcohol, subjecting the shaped mass to super-atmospheric pressure in an atmosphere containing a substantial proportion of the vapor of a solvent for the polyvinyl alcohol, and drying the resultant article.

3. The novel process of making articles of granular material bonded with polyvinyl alcohol which comprises the steps of forming a shaped mass from a mixture of granular material and polyvinyl alcohol, subjecting the shaped mass to the action of steam under super-atmospheric pressure, and drying the resultant article.

4. The novel process of making articles of granular material bonded with a solvent-softenable binder which comprises the steps of forming a shaped mass from a mixture of granular material and solvent-softenable binder, subjecting the shaped mass to super-atmospheric pressure in an atmosphere containing a substantial proportion of the vapor of a solvent for said binder, introducing vapors of a compound reactive with said binder to insolubilize the same into said atmosphere after bonding by the solvent vapor has occurred, and drying the resultant article.

NORMAN P. ROBIE.